Figure 1:
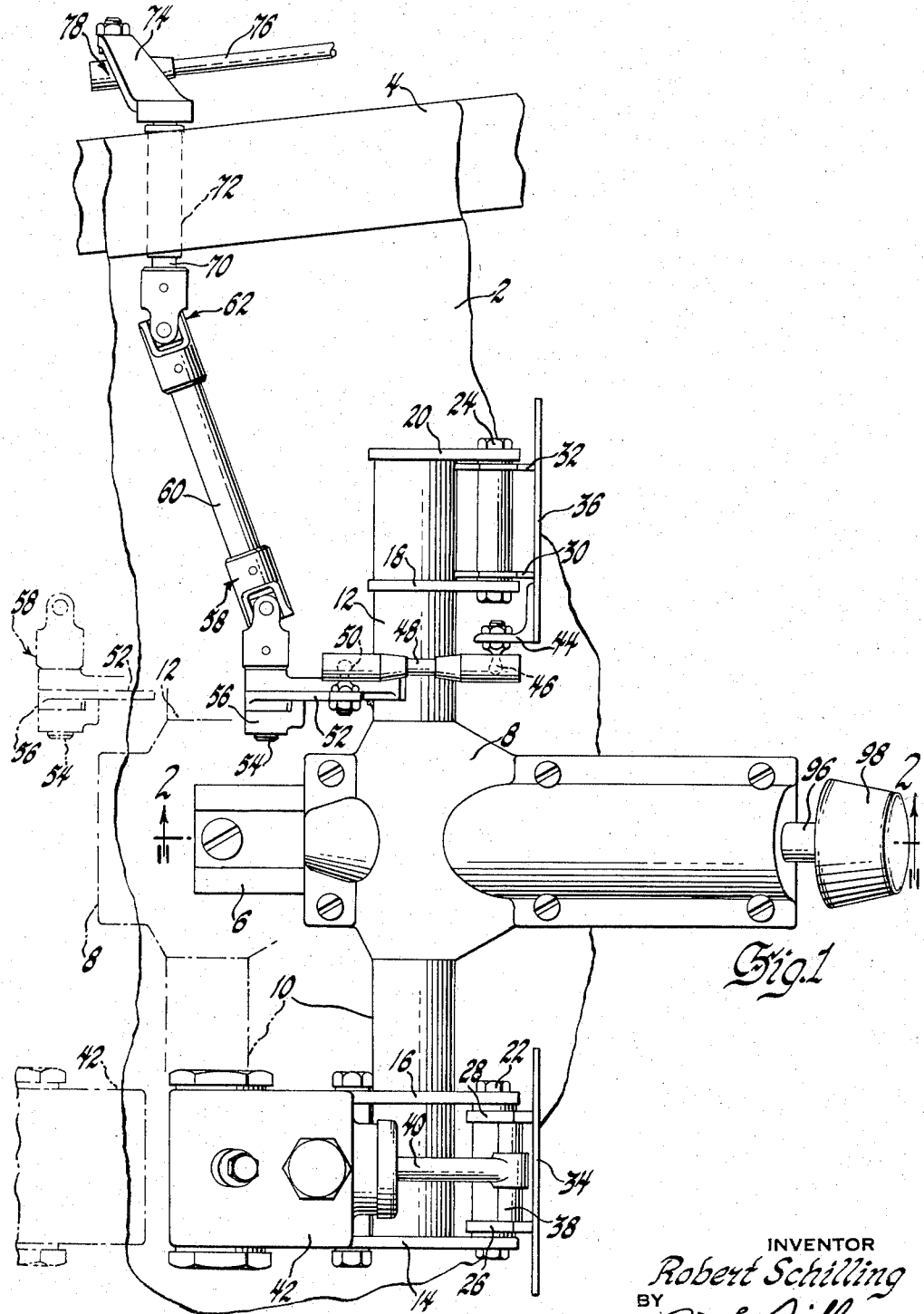

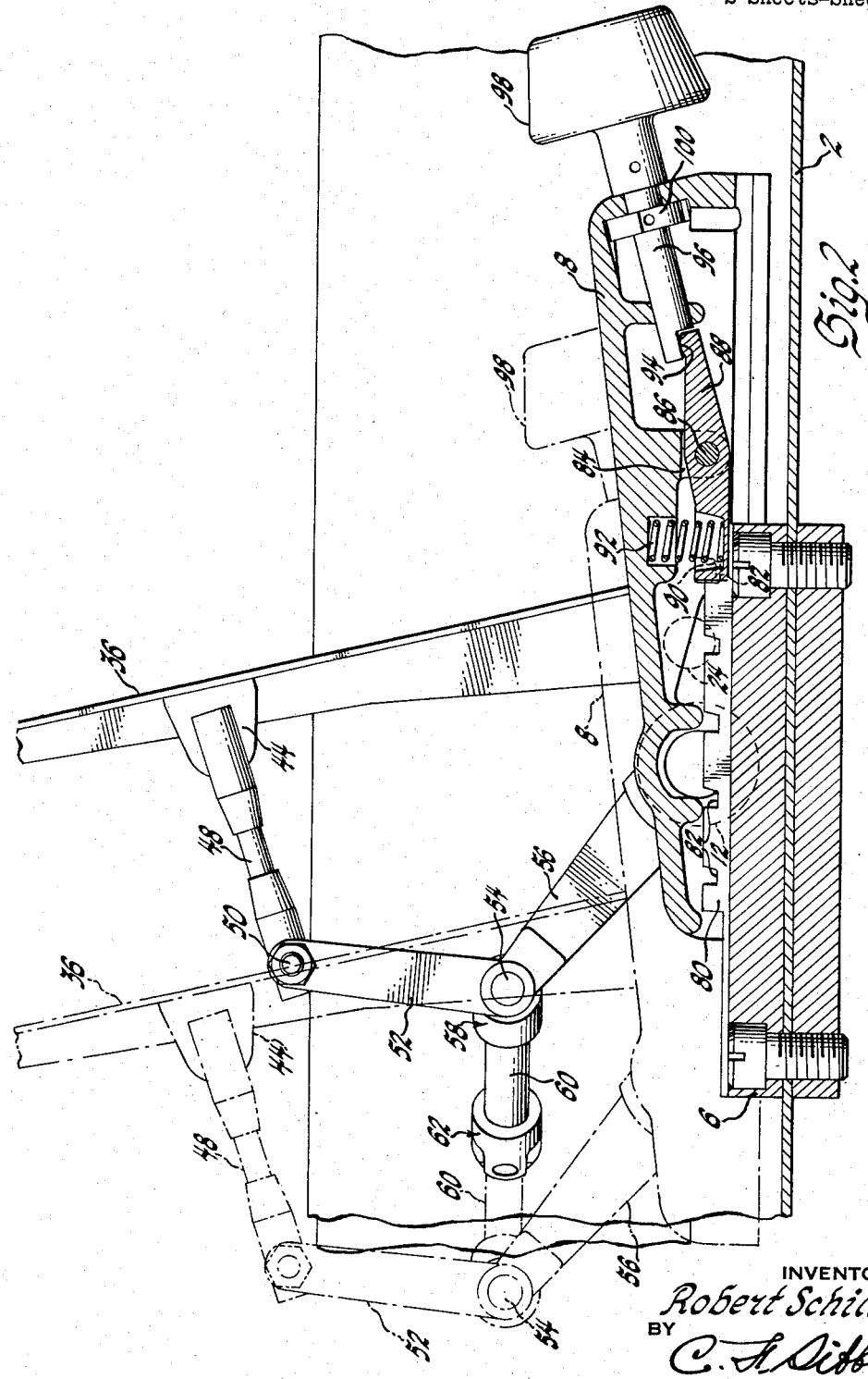

United States Patent Office 2,873,616
Patented Feb. 17, 1959

2,873,616

ADJUSTABLE CONTROL MECHANISM

Robert Schilling, Bloomfield Hills, Mich., assignor to General Motors Corporation, Detroit, Mich., a corporation of Delaware Application January 13, 1954, Serial No. 403,761

4 Claims. (Cl. 74—478)

This invention relates to vehicle control mechanisms and more particularly to an adjustable mounting for the throttle and brake control of a vehicle.

In certain types of specialized vehicles, notably racing cars, space limitations prohibit the use of an adjustable seat mechanism. Consequently, in order to accommodate operators of different statures, it is desirable that other means be provided for positioning the principal controls a sufficient distance from the seat to render the operation thereof most convenient to the operator. However, since the throttle pedal is normally mechanically interconnected with the throttle control rod, bodily fore and aft movement of a conventional throttle pedal would alter the throttle setting or effect a substantial change in the normal angle of inclination of the pedal.

An object of the present invention is to provide a throttle and brake control mechanism which is longitudinally adjustable to accommodate operators of various heights.

Another object is to provide a mechanism of the stated character wherein linear movement of the mechanism does not alter the throttle setting.

A further object is to provide a fore and aft adjustable throttle and brake control pedestal wherein the pivotal range of operation of the pedal and the normal angles of inclination thereof remains constant irrespective of the fore and aft position of adjustment of the mechanism.

A still further object is to provide a positive and convenient latch mechanism for positively securing the control mechanism in a plurality of fore and aft positions.

These and other objects and advantages of the invention will become more fully apparent as reference is had to the accompanying specification and drawings wherein:

Fig. 1 is a plan view showing the form and arrangement of the control mechanism and its relation to the vehicle frame, and Fig. 2 is a side elevational view, partly in section, looking in the direction of arrows 2—2 of Fig. 1, showing the form and arrangement of the latch mechanism.

Referring now to the drawings and particularly Fig. 1, there is illustrated an adjustable brake and throttle control mechanism which is disposed substantially at the midplane of the vehicle on a frame cross member 2. Cross member 2 is, in turn, secured to the frame side members 4. As seen in Figs. 1 and 2, a longitudinally extending guide plate 6 is bolted to cross member 2. Slidably disposed on plate 6 is the central housing 8 of the control mechanism. Extending transversely outwardly from the opposite sides of housing 8 are integral tubular members 10 and 12. Rigidly secured on the outer portions of members 10 and 12 are laterally spaced parallel rearwardly extending brackets 14 and 16 and 18 and 20, respectively. Supported transversely between the rearward ends of brackets 14 and 16 and 18 and 20 are bolts 22 and 24 which extend through the forwardly extending spaced brackets 26 and 28, 30 and 32, secured respectively at the base of a brake pedal 34 and throttle pedal 36 and provided pivotal support therefore. Brake pedal 34 is provided with a transverse shaft portion 38 which, in turn, engages a plunger rod 40 extending rearwardly outwardly from the brake master cylinder 42. Master cylinder 42 is mounted between the forward ends of brackets 14 and 16 in alignment with pedal 34. Midway of its inner edge, throttle pedal 36 is provided with a forwardly extending integral tab 44 having a ball joint 46 threadably secured thereto. A relatively short link 48 is operatively connected at one end with ball joint 46 and at the other end with a ball joint 50, threadably secured at the upper end of an upwardly extending lever 52. At its lower end, lever 52 is secured at the mid portion of a transversely extending rotatable shaft 54 journalled in the slotted upper end of a forwardly inclined bracket 56. The lower end of bracket 56 is rigidly secured to tubular member 12. At its outer end, shaft 54 is provided with a universal joint assembly 58 which is connected at its opposite end with the inner end of a generally transversely extending shaft 60. At its outer end, shaft 60 is similarly connected to a universal joint assembly 62 carried by rotatable shaft 70. Shaft 70 is mounted for rotation on a transverse axis in a suitable bearing 72 secured in the frame side member 4. At its outer terminal end, shaft 70 is provided with a generally downwardly extending lever 74. A longitudinally extending throttle control rod 76 is connected to the lower free end of lever 74 by a ball and joint connection 78 and at its opposite end, not shown, operatively engages the vehicle throttle mechanism, not shown.

As will be apparent from Fig. 2, in order to impart linear movement to rod 76, throttle pedal 36 must be swingably displaced about its pivotal connection 24. When pedal 36 is moved forwardly, shaft link 48 causes lever 52 to rotate counterclockwise and impart counterclockwise rotation to shaft 54 and 60 and 70, thereby imparting rearward swinging movement to lever 74. However, when the entire control mechanism is moved along guide plate 6, the angle of inclination of pedal 36 remains unchanged and therefore does not impart rotation to shafts 54, 60 and 70. Since universal connections 58 and 62 permit shaft 60 to swing in a horizontal plane to compensate for the change in angularity resulting from longitudinal shifting of the axis of shaft 54, movement of the pedestal fore and aft has no effect upon the position of the throttle rod 76. Consequently, the control mechanism may be moved throughout its entire fore and aft range without effecting either the angular inclination of pedal 36 or its normal range of movement. Thus, it is seen that the throttle rod is directly responsive to swingable movement of pedal 36, yet is entirely uneffected by bodily longitudinal movement thereof.

In order to accomplish adjustment of the control pedestal to various fixed longitudinal positions in accordance with the present invention, housing 8 is disposed for slidable movement on guide plate 6, as previously mentioned. Guide plate 6 is provided with an integral ribbed portion 80 having longitudinally spaced notches 82 formed therein. Interiorly of housing 8 there is formed an integral depending portion 84 which is adapted to receive a pivot member 86 upon which is swingably supported a pawl 88. Pawl member 88 is formed with a transversely extending rib 90 which is normally spring urged downwardly by coil spring 92 to effect engagement with one of the notches 82. At its rearward extremity, pawl 88 engages the flat surface 94 of a shaft 96. Shaft 96 is rotatably supported in housing 8 and operative in response to rotation in either direction of knob 98 to depress the rear end portion of pawl 88 and disengage the blade 90 to permit slidable movement of housing 8 along guide track 6. Upon release of manual control knob 98, a spring 100 rotatably returns shaft 96 to the position shown in Fig. 2 and permits the blade 90 of pawl 88 to engage the next notch 82 in response to downward pressure of the spring 92. Thus, it will be seen that knob 98 must be retained in the rotated position to maintain the blade 90 in released position and permit slidable movement of the housing 8 through its full range. It will, therefore, be apparent that when knob 98 is rotated to disengage blade 90 and thereafter released, blade 90 will automatically engage the next notch 82 when housing 8 is moved along the guide track 6.

Since the master cylinder 42 of the brake mechanism is physically connected to the vehicle wheels by flexible brake hoses, not shown, it will be understood that the hoses will flex between the master cylinder and wheel connection during fore and aft movement of the housing and will, therefore, not effect the angular inclination or the range of angular travel of the brake pedal 34.

From the foregoing, it will be seen that a simple and effective adjustable brake and throttle control mechanism has been provided which is especially suitable for vehicles having rigidly mounted seats. It should be particularly noted that the invention permits substantial fore and aft adjustment without disturbing the angularity or range of movement of the respective pedals.

While but one embodiment has been shown and described, it will be apparent that other changes and modifications may be made therein without departing from the invention. It is therefore, to be understood that it is not intended to limit the invention to the embodiment shown, but only by the scope of the claims which follow.

I claim:

1. In a motor vehicle or the like equipped with a pedal control element, the combination therewith of a base member pivotally supporting said element and longitudinally movable to a plurality of selected positions, a control member rotatable in a fixed support laterally spaced from said element and means operably interconnecting said element and said control member, said means including a lever located forwardly of said element and linked thereto by means pivotally connected both to said lever and said element, transversely extending means journalled in means carried by said base member and rotatable by said element through said lever, and linkage means interconnecting said transversely extending means and said control member through a pair of universal joints, located one at either end of said linkage means.

2. In a motor vehicle or the like equipped with a pedal control element, the combination therewith of a base member pivotally supporting said element, said base member being longitudinally movable to a plurality of selected positions, a control member rotatable in a fixed support laterally spaced from said element and means operably interconnecting said element and said control member, said means including a lever located forwardly of said element and linked thereto by means pivotally connected both to said lever and said element, transversely extending means bracket-supported from said base member and rotatable by said element through said lever, and linkage means interconnecting said transversely extending means and said control member through a pair of universal joints, located one at either end of said linkage means.

3. In a motor vehicle or the like equipped with a pedal control element, the combination therewith of a base member pivotally supporting said element, fixed means slidably supporting said base member and comprising a raised portion having therein a plurality of longitudinally spaced notches, means pivotally supported by said base member carrying rib means adapted to be accommodated in any one of said notches, said last means having spring means associated therewith tending to maintain said rib means in a selected notch, a control member rotatable in a fixed support laterally spaced from said element and means operably interconnecting said element and said control member, said means including a lever located forwardly of said element and linked thereto by means pivotally connected both to said lever and said element, transversely extending means bracket-supported from said base member and rotatable by said element through said lever, and linkage means interconnecting said transversely extending means and said control member through a pair of universal joints, located one at either end of said linkage means.

4. The combination of claim 3 where said base member mounts a second pedal control element together with a hydraulic cylinder confining a piston linked to said second pedal control element, said second pedal control element being pivotally connected to said base member.

References Cited in the file of this patent

UNITED STATES PATENTS

| | | |
|---|---|---|
| 618,492 | Bell | Jan. 31, 1899 |
| 902,744 | Koretz | Nov. 3, 1908 |
| 1,214,866 | Young | Feb. 6, 1917 |
| 1,464,601 | Fairchild | Aug. 14, 1923 |
| 1,657,738 | Booth | Jan. 31, 1928 |
| 2,020,440 | Stein | Nov. 12, 1935 |
| 2,181,883 | Gibson | Dec. 5, 1939 |
| 2,420,528 | Eaton | May 13, 1947 |
| 2,516,397 | Kress et al. | July 25, 1950 |
| 2,545,086 | Harris | Mar. 13, 1951 |
| 2,562,974 | Williams | Aug. 7, 1951 |
| 2,599,656 | Ostrow | June 10, 1952 |
| 2,610,006 | Boyce | Sept. 9, 1952 |